(12) United States Patent
Djaïd

(10) Patent No.: US 6,246,314 B1
(45) Date of Patent: Jun. 12, 2001

(54) VEHICLE LOCATOR DEVICE

(76) Inventor: Omeur Djaïd, 1010, rue Louise, Laval P. Q. (CA), H7A 2M2

(*) Notice: Subject to any disclaimer, the term of this patent is extended or adjusted under 35 U.S.C. 154(b) by 0 days.

(21) Appl. No.: 09/542,913

(22) Filed: Apr. 4, 2000

(51) Int. Cl.$^7$ .................................................. B60Q 1/00
(52) U.S. Cl. ...................... 340/425.5; 340/539; 340/471; 340/472; 340/468; 340/825.49
(58) Field of Search ................ 340/425.5, 993, 340/988, 539, 825.59, 825.69, 825.72, 471–472, 487; 362/479, 493, 527; 40/592, 610, 601

(56) References Cited

U.S. PATENT DOCUMENTS

| | | |
|---|---|---|
| 3,783,267 | 1/1974 | Thomas . |
| 3,975,849 | 8/1976 | Tuleja . |
| 3,997,870 | 12/1976 | Horvath . |
| 4,052,697 * | 10/1977 | Daifotes . |
| 4,259,660 * | 3/1981 | Oliver ................................... 340/120 |
| 4,977,849 * | 12/1990 | Brinton .................................. 116/28 |
| 4,995,278 * | 2/1991 | Huang ....................................... 74/89 |
| 5,089,803 * | 2/1992 | Bohn ................................... 340/425.5 |
| 5,251,568 * | 10/1993 | Feichtiger et al. ................. 116/28 R |
| 5,388,546 * | 2/1995 | Lombard ............................. 116/209 |
| 5,438,780 * | 8/1995 | Winner ................................... 40/514 |
| 5,677,664 | 10/1997 | Sawinski . |
| 5,786,758 * | 7/1998 | Bullock . |
| 5,933,081 * | 8/1999 | Jones .................................... 340/539 |
| 5,942,971 | 8/1999 | Fauci et al. . |
| 6,023,218 * | 2/2000 | Tremblay .......................... 340/425.5 |

* cited by examiner

Primary Examiner—Daniel J. Wu
Assistant Examiner—Son Tang

(57) ABSTRACT

The present invention concerns a vehicle locator device with a deployable arm that is protected from bad weather conditions, and that can be secured to an existing vehicle's roof luggage fixture or directly secured onto a vehicle's roof. Upon a single activation of a remote control, a localization arm is deployed in a vertical position (or retracted in an horizontal position) and one or more light sources mounted on the arm as well as, preferably, an audible signal are activated (or deactivated) to help in visually locating the vehicle.

17 Claims, 7 Drawing Sheets

VEHICLE LOCATOR DEVICE

FIELD OF THE INVENTION

The present invention relates to a vehicle locator device and more specifically to a remotely activated deployable and retractable visual vehicle locator device.

BACKGROUND OF THE INVENTION

Nowadays more and more people own vehicles, and parking lots for example become bigger and bigger. It may become difficult for a person to quickly find his vehicle among many others. The exact location may not be easily remembered. As described in U.S. Pat. No. 3,783,267 granted on Jan. 1, 1974 to Thomas and entitled "Extendible vehicle light mount", a system with a light mounted on an elevating boom already exists. However, this system is intended for emergency vehicles and could also be used when the vehicle is in motion. This invention actually increases the visibility of already existing warning devices. The warning light is by no means small or to be hidden, both in the elevated or in the retracted position, nor is the system hidden in any way while in retracted position. The warning light cannot also be protected against bad weather conditions since it always remains exposed.

U.S. Pat. No. 4,052,697 granted on Oct. 4, 1977 to Daifotes describes an "Emergency blinker and flag display". This invention's purpose is to give a warning signal and attract attention in the event of a robbery in a taxi for example. The warning element is a flag mounted on an arm which opens up in a jack-knife fashion once activated. This invention is activated from within the vehicle and therefore cannot be used to localize the vehicle from a remote location when nobody is on board the vehicle. The flag display mechanism needs to be manually folded back to its retracted position, which is time-consuming and not user-friendly. Furthermore, this display has an illuminating light that can serve to attract attention, but this last use is not so effective since the light is positioned inside a half tubular extension member and since it is mainly intended to illuminate the flag, hence not positioned for maximum visibility to localize a vehicle from a remote location and in the dark.

Another example of location device is found in U.S. Pat. No. 5,786,758 granted on Jul. 28, 1998 to Bullock and entitled "Vehicle Locator System". This system has a remotely activated warning light and can also remotely activate the vehicle's horn. This invention however needs to be installed whenever it is to be used, and removed when the vehicle is to be in movement. Those actions can be time consuming, and could even entice the vehicle's owner not to use the system for this troublesome reason. Furthermore, the system is not even partially hidden, hence attracting the attention of every passerby towards the vehicle, even when the system is not in use but installed. The system is not 'foldable', nor it is compact, hence will take up useful space in the car when not in use and put away, and could also be qualified as fragile when stored in the car.

OBJECTS OF THE INVENTION

It is therefore a general object of the present invention to provide a vehicle locator device of the character described which obviates the above noted disadvantages.

Another object of the present invention is to provide a vehicle locator device that allows for remote activation.

Another object of the present invention is to provide a vehicle locator device that can be permanently installed on a vehicle and partially hidden when not activated.

A further object of the present invention is to provide a vehicle locator device that is protected against bad weather conditions when not activated.

Another object of the present invention is to provide a vehicle locator device that is easily manufacturable and that can be easily mounted to a large variety of vehicles' roof notwithstanding the other devices already mounted on the vehicle, and even mounted on other devices already mounted on a vehicle's roof, such as a roof luggage fixture.

SUMMARY OF THE INVENTION

The present invention consists of a vehicle locator device comprising:

a remote transmitting unit including a transmitter and a first power source;

an activation switch mounted on said remote unit and connected to said transmitter, said transmitting unit generates and emits a signal via said transmitter upon activation of said activation switch;

a receiving unit generally mounted on a vehicle and including a control circuit and a receiver, both being connectable to a second power source, said receiving unit being adapted to receive said signal emitted from said transmitting unit;

an arm support structure including a base section adapted to be secured onto a roof of said vehicle, and an arm section pivotally mounted onto said base section via an actuator device between an activated deployed position and a non-activated retracted position;

one or more light sources mounted onto said arm section of said support structure, said actuator device and one or more light sources being connected to said receiving unit, both said one or more light sources and actuator device being energized by said second power source via said control circuit and disposed to either be turned on and deploy said arm section respectively as said receiving unit receives a first of said signal from said transmitting unit, or be turned off and retract said arm section respectively as said receiving unit receives a second of said signal from said transmitting unit.

Preferably, the vehicle locator device further comprises a first and second limit switches connected to said control circuit and detecting said retracted and deployed positions of said arm section respectively, said second limit switch being used to disconnect said actuator device deploying said arm section from said second power source and connect said light sources to said second power source, said first limit switch being used to disconnect said actuator device retracting said arm section from said second power source.

Preferably, the control circuit of said receiving unit includes two relays interconnected and connected to said first and second limit switches, said second power source and said actuator device.

Preferably, the relays being double position double contact type relays.

Preferably, the base section is substantially horizontally secured onto said roof and said arm section is always positioned between said retracted and deployed positions being substantially horizontal and vertical respectively.

Preferably, the support structure is adapted to be secured to an existing transverse roof luggage fixture.

Preferably, the support structure is generally elongated in shape and transversely positioned to a direction of displacement of said vehicle.

Preferably, the light sources and actuator device are protected against bad weather conditions by both said base and arm sections when the latter is into said non-activated retracted position.

Preferably, the arm section includes a first end pivotally mounted onto said base section, a second end adapted to receive said one or more light sources and a substantially mid-section adapted to pivotally engage a first extremity of a support bar, said support bar having a second extremity pivotally secured to a block slidably mounted onto said base section, said block being linearly displaced along said base section by said actuator device between said two limit switches.

Preferably, the actuator device includes a reversible electrical motor activated in a first operating and a second reversible operating modes to deploy and retract said arm section respectively, and said second power source being a direct current supply of said vehicle.

Preferably, the actuator device further includes an endless screw rotatably supported into said base section and rotatably engaging a nut fixedly secured to said block.

Optionally, the arm section includes a lower and upper members, said lower member includes a bottom end pivotally mounted onto said base section, a substantially mid-section adapted to pivotally engage a first extremity of a support bar, said support bar having a second extremity pivotally secured to a block slidably mounted onto said base section, said block being linearly displaced along said base section by said actuator device between a first and a second limit positions corresponding to said retracted and deployed positions respectively, said lower member being adapted to slidably receive said upper member between a lower folded and a upper unfolded positions using a second actuator device energized by said second power source via said control circuit and mounted onto said lower member, said upper member being adapted to receive said one or more light sources at an upper extremity.

Preferably, the vehicle locator device further comprises a first and second limit switches connected to said control circuit and detecting said retracted and deployed positions of said arm section respectively, a third and fourth limit switches connected to said control circuit and detecting said unfolded and folded positions of said upper member of said arm section respectively, said second limit switch being used to disconnect said first actuator device deploying said arm section from said second power source and connecting said second actuator device unfolding said upper member to said second power source, said fourth limit switch being used to disconnect said second actuator device unfolding said upper member from and connect said light sources to said second power source, said third limit switch being used to disconnect said second actuator device folding said upper member from and connect said first actuator device retracting said arm section to said second power source, said first limit switch being used to disconnect said first actuator device retracting said arm section from said second power source.

Preferably, the first actuator device includes a reversible electrical motor activated in a first operating and a second reversible operating modes to deploy and retract said arm section respectively, said second actuator device includes a second reversible electrical motor activated in a first operating and a second reverse operating modes to unfold and fold said upper member of said arm section respectively, said second power source being a direct current supply of said vehicle.

Preferably, the first actuator device further includes a first endless screw rotatably supported into said base section and rotatably engaging a first nut fixedly secured to said block, and said second actuator device further includes a second endless screw rotatably supported into said lower member of said arm section and rotatably engaging a second nut fixedly secured to a lower extremity of said upper member of said arm section.

Preferably, the control circuit of said receiving unit includes two relays interconnected and connected to said first, second, third and fourth limit switches, said second power source and said first and second actuator devices.

BRIEF DESCRIPTION OF THE DRAWINGS

In the annexed drawings, like reference characters indicate like elements throughout.

DETAILED DESCRIPTION OF THE PREFERRED EMBODIMENTS

Figure 1:
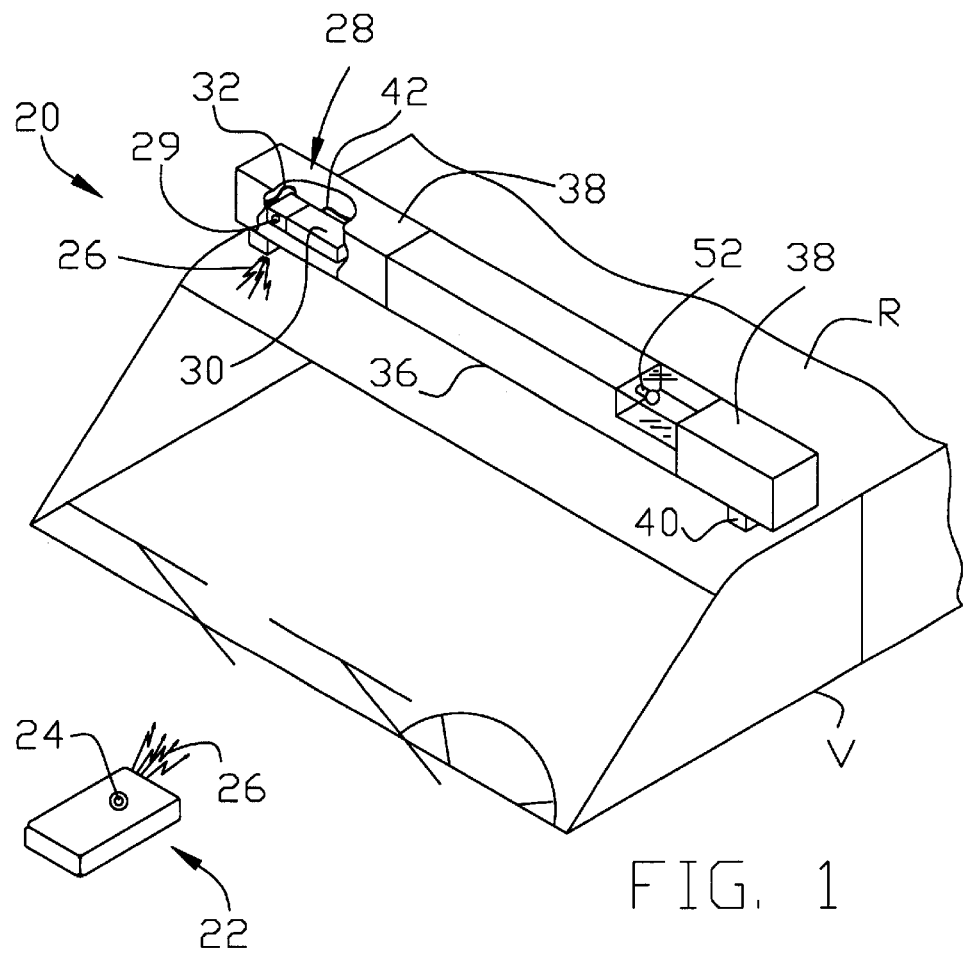
FIG. 1 is a front perspective view of an embodiment according to a vehicle locator device of the present invention showing a support structure in a non-activated retracted position on the roof of a road vehicle.

Referring to FIG. 1, there is shown a vehicle locator device 20 comprising a remote transmitting unit, preferably a remote control 22, a receiving unit 28 and an arm support structure 36. The remote sensing unit 22 includes a signal transmitter (not shown) connected to a first power source (not shown), preferably a standard DC battery, and an activation switch 24.

The remote sensing unit 22 is preferably carried by the user, or vehicle driver, when he is away from his vehicle V. Upon activation of the activation switch 24 by the user, a signal 26 is generated and emitted from the transmitter (not shown) of the remote sensing unit 22.

The receiving unit 28 is generally internally mounted to the arm support structure 36 and includes a receiver 29, a preferably electrical circuit 30 and a power cord 32 connecting the receiver 29 to a second power source 34, preferably the 12 VDC battery of the vehicle V. Optionally, the power cord 32 could be connected to the second power source 34 via a plug adapted to engage into preferably a standard cigarette lighter (not shown) or any other power port available inside the vehicle V. The receiver 29 of the receiving unit 28 is adapted to receive and recognize the signal 26 emitted from the transmitting unit 22.

In order to be highly visible from a remote location, the arm support structure 36 is secured to the roof R of the same vehicle V. The arm support structure 36 is generally elongated in shape and preferably transversely positioned with respect to the direction of displacement of the vehicle V; any other orientation would also be acceptable. The arm support structure 36 includes a substantially horizontally positioned base section 38 secured onto the roof R of the vehicle V. Preferably, a mounting fixture 40 is mounted to the bottom interface section of the base section 38 to secure the arm support structure 36 to the roof R. A second electric connecting cord 42, preferably hidden, connects the circuit 30 of the receiving unit 28 to an actuator, preferably including a reversible electric motor 44 located at a first extremity of the arm support structure 36.

Figure 2:
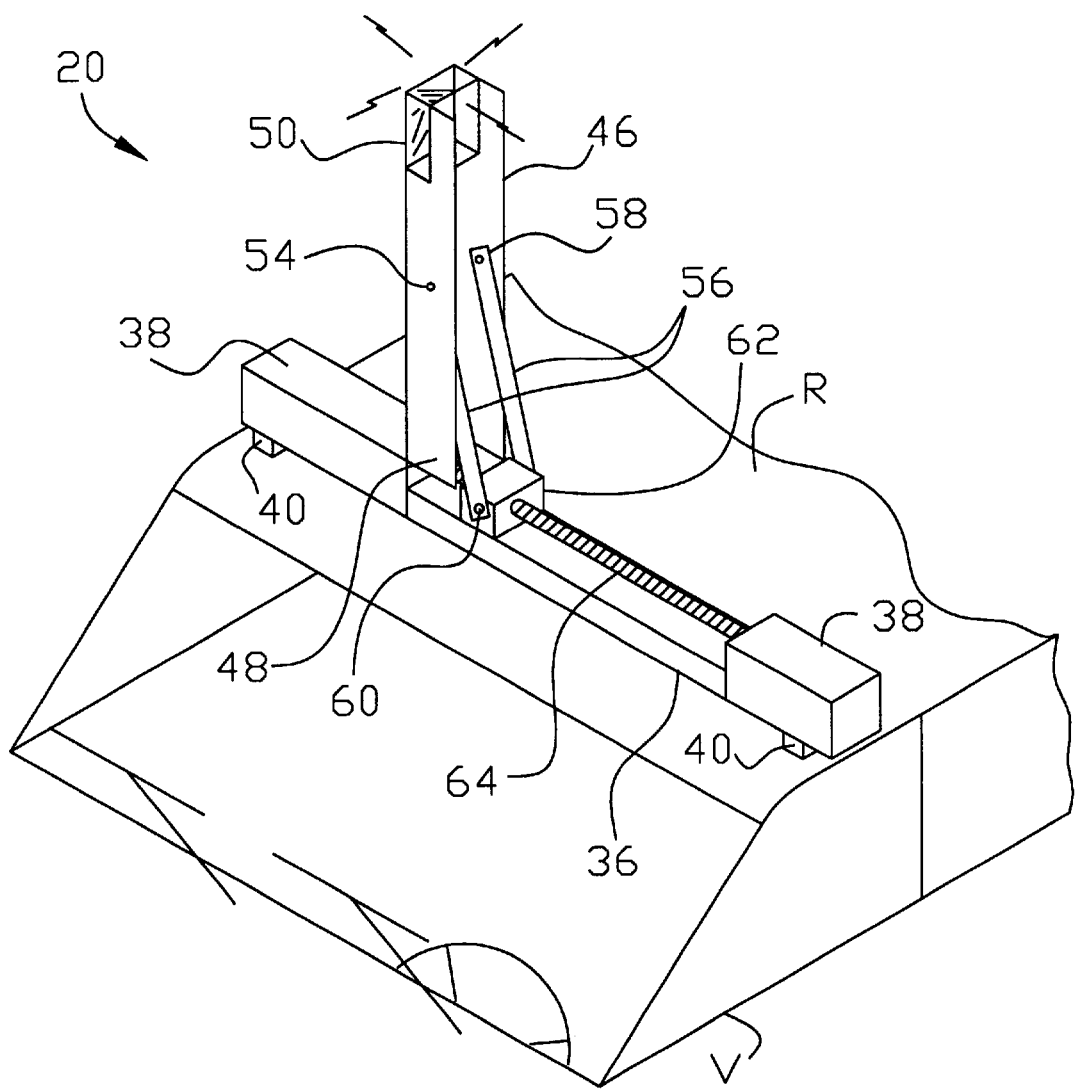
FIG. 2 is a front perspective view of the arm support structure of FIG. 1 in the activated deployed position.

The arm support structure 36 of FIG. 1 is in a lower non-activated retracted position. FIG. 2 shows the same arm support structure 36 in an upper activated deployed position. The deployment of the arm support structure 36 is the result of the signal 26 being received by the receiving unit 28. Consequently, the latter sends a pulse that allows power, via the circuit 30, to reach to the motor 44 of the arm support structure 36 from the second power source 34.

The arm support structure 36 also includes an arm section 46 preferably located at its central part. In a first embodiment of the vehicle locator device 20, the arm section 46 has a first end 48 pivotally mounted to the second extremity of the base support 38 allowing the arm to move in an angular fashion between the essentially horizontal retracted position (FIG. 1) and the essentially vertical deployed position (FIG. 2). The second end 50 of the arm section 46 is preferably made of a strong material with a preferably semi-transparent characteristic adapted to receive one or more light sources 52. The light sources 52 are connected to the second power source 34 via a generally hidden second connecting cord (not shown). The arm section 46 is adapted to pivotally receive a first extremity 58 of a support bar 56 at approximately mid-length 54. The second extremity 60 of the support bar 56 is pivotally mounted onto a sliding block 62. The block 62 is slidably mounted on the central section of the base section 38 along guiding rails (not shown). The motor 44 drives an endless rotating screw 64 of the first actuator rotatably mounted, via bearings 67, on the base section 38. The screw 64 engages a nut 65 fixedly secured inside sliding block 62 to slidably displace the latter upon rotation of the screw 64.

The arm section 46 is preferably of a U-shape cross-section to allow for the endless screw 64, the support bar 56 and the block 62 to fit therein and being therefore protected against various weather conditions when the arm section 46 is in its horizontal retracted position. The material for the base support 38 and the arm section 46 that are to be exposed to outside temperature, especially when the arm section 46 is in an horizontal retracted position, are of a resistant material against UV, humidity, snow, wind, etc.

Upon application of the second power source 34 (FIG. 1), the motor 44 rotates rotating screw 64, which engages a linear sliding movement of the nut 65 and its corresponding block 62 towards the motor 44, thereby causing, by the intermediary of the support bar 56 pivotally secured to both the block 62 and the arm section 46, the deployment of the arm section 46 from its retracted horizontal position (FIG. 1) into its elevated vertical position (FIG. 2). The block 62 linearly slides along the central section of the base support 38 and the screw 64 upon activation between a first and a second limit positions determined by first and second limit switches 66,68 respectively and corresponding to the two retracted and deployed limit positions of the arm section 46 respectively. Upon the block 62 reaching of the second limit switch 68, preferably a pair of parallel switches simultaneously activated, the arm 46 stops moving and the light sources 52 are energized and emit a visual signal for the user. In this fully deployed limit position of the arm 46, the light sources 52 are high enough to be above roofs R of surrounding vehicles and visually detected by the user.

Figure 7:
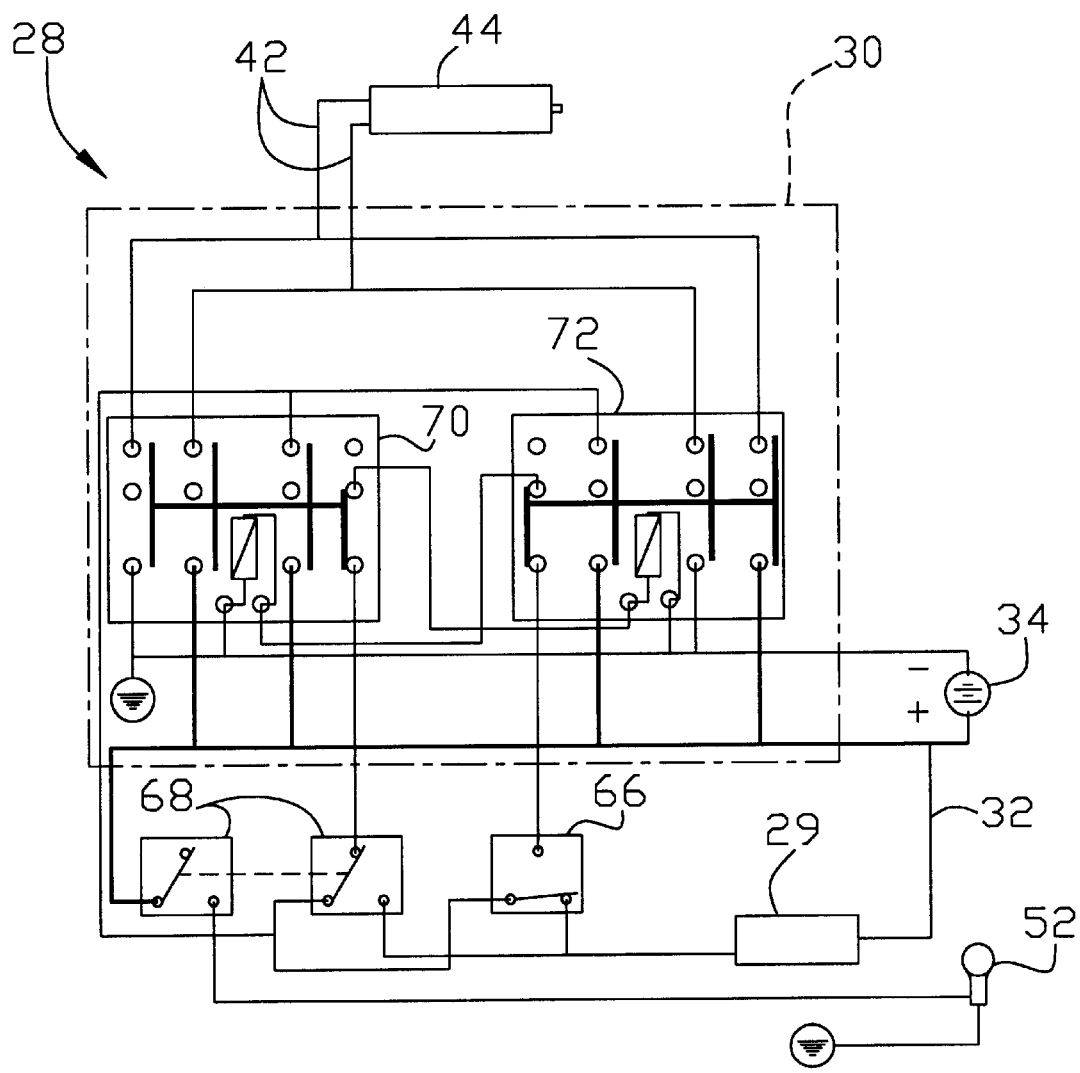
FIG. 7 is a block diagram of the electrical circuit of the embodiment of FIG. 1 with the switches positioned for the retracted position of the arm section.

Upon a first activation of the activation switch 24, a first pulse of current is sent by the receiver 29 to the control circuit 30 via second limit switch 66 (detailed in the block diagram of FIG. 7) that toggles a first double position double contact (2P2T) relay 72 to provide power to the motor 44. The latter makes the arm section 46 to deploy from its retracted first limit position up to its deployed second limit position. When reaching the latter, the sliding block 62 activates the second limit switch 68 that toggles back the first relay 72 to cut the power going to the motor 44 and, at the same time, provides power to the light sources 52. The vehicle locator device 20 remains in that position operating deployed until another command is sent.

Figure 8:
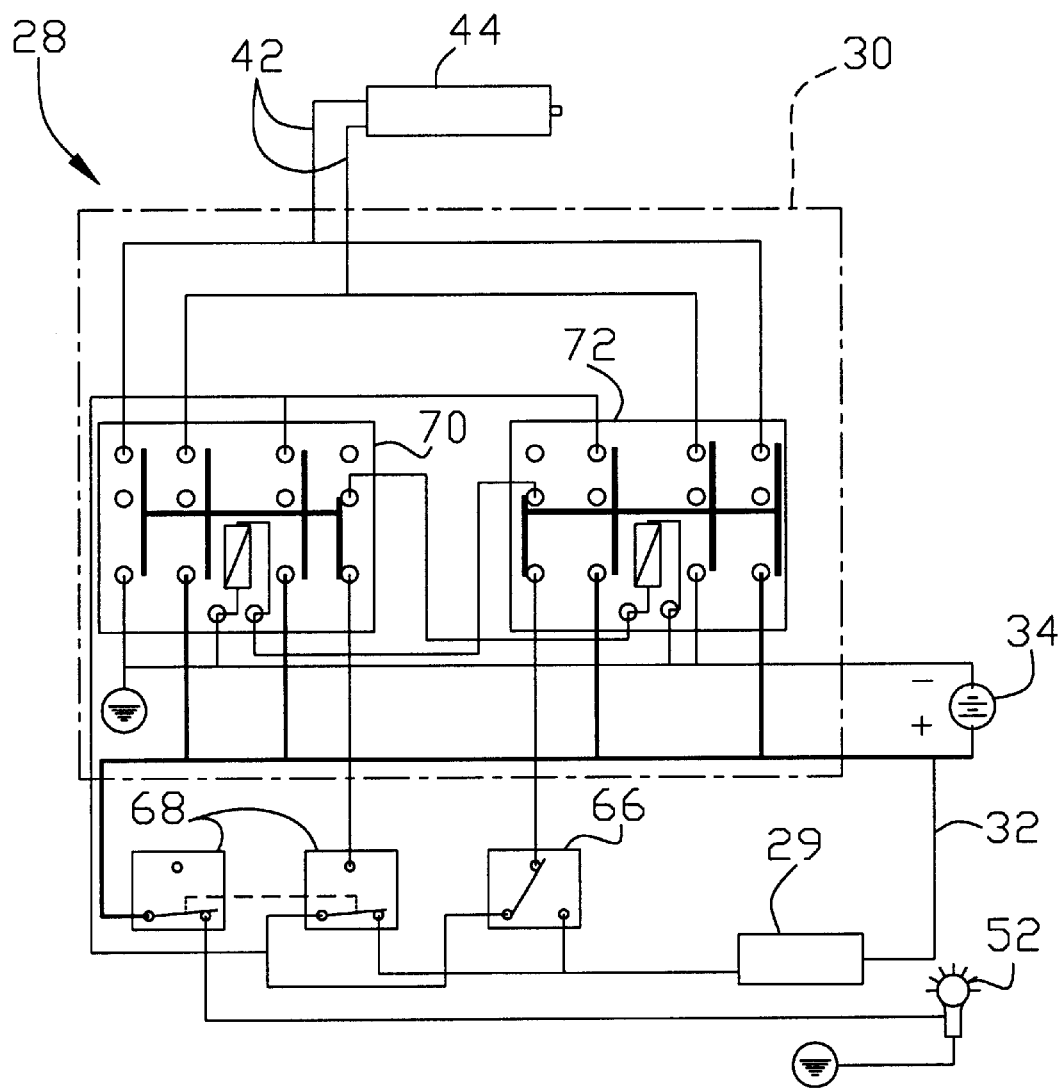
FIG. 8 is a diagram similar to FIG. 7 but referring to the embodiment of FIG. 2 with the switches positioned for the deployed position of the arm section.

To stop the device 20, a second activation of the activation switch 24 is required to send a second pulse of current from the receiver 29 to the control circuit 30 via first limit switch 68 that toggles a second double position double contact (2P2T) relay 70 to provide a reverse power to the motor 44 and, the block 62 moving away from switch 68 that cuts power going to the light sources 52. The motor 44 then makes the arm section 46 to retract back down to its first retracted limit position. When reaching the latter, the sliding block 62 activates the first limit switch 66 that toggles back the second relay 70 to cuts the power going to the motor 44, with the vehicle locator device 20 being in a completely retracted position, as detailed in the block diagram of FIG. 8.

Optionally, the second pulse of current may be caused by the vehicle user unlocking the vehicle doors or by simply starting the vehicle's engine. Ultimately, the latter option has the advantage that the vehicle locator device 20 cannot be forgotten in deployed position before the vehicle is being displaced.

Figure 3:
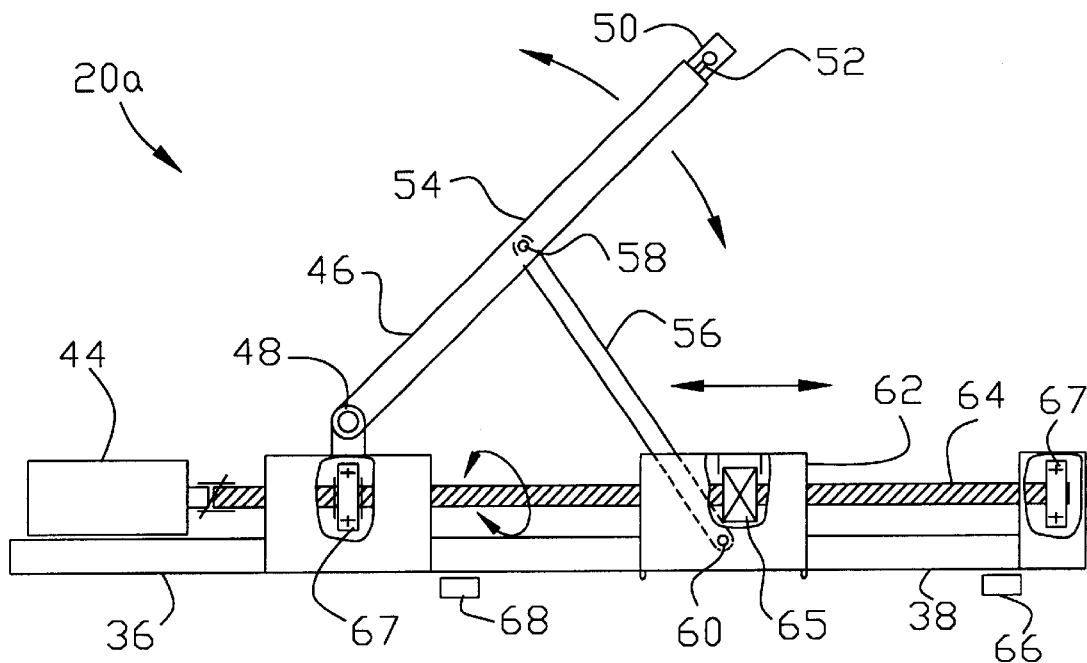
FIG. 3 is a front elevation view of a second embodiment of the arm support structure of FIG. 1 with a weather unprotected arm section in an activated but partially deployed position.

FIG. 3 shows a second embodiment 20a with a weather unprotected arm section 46a in a partially deployed position.

Figure 4:
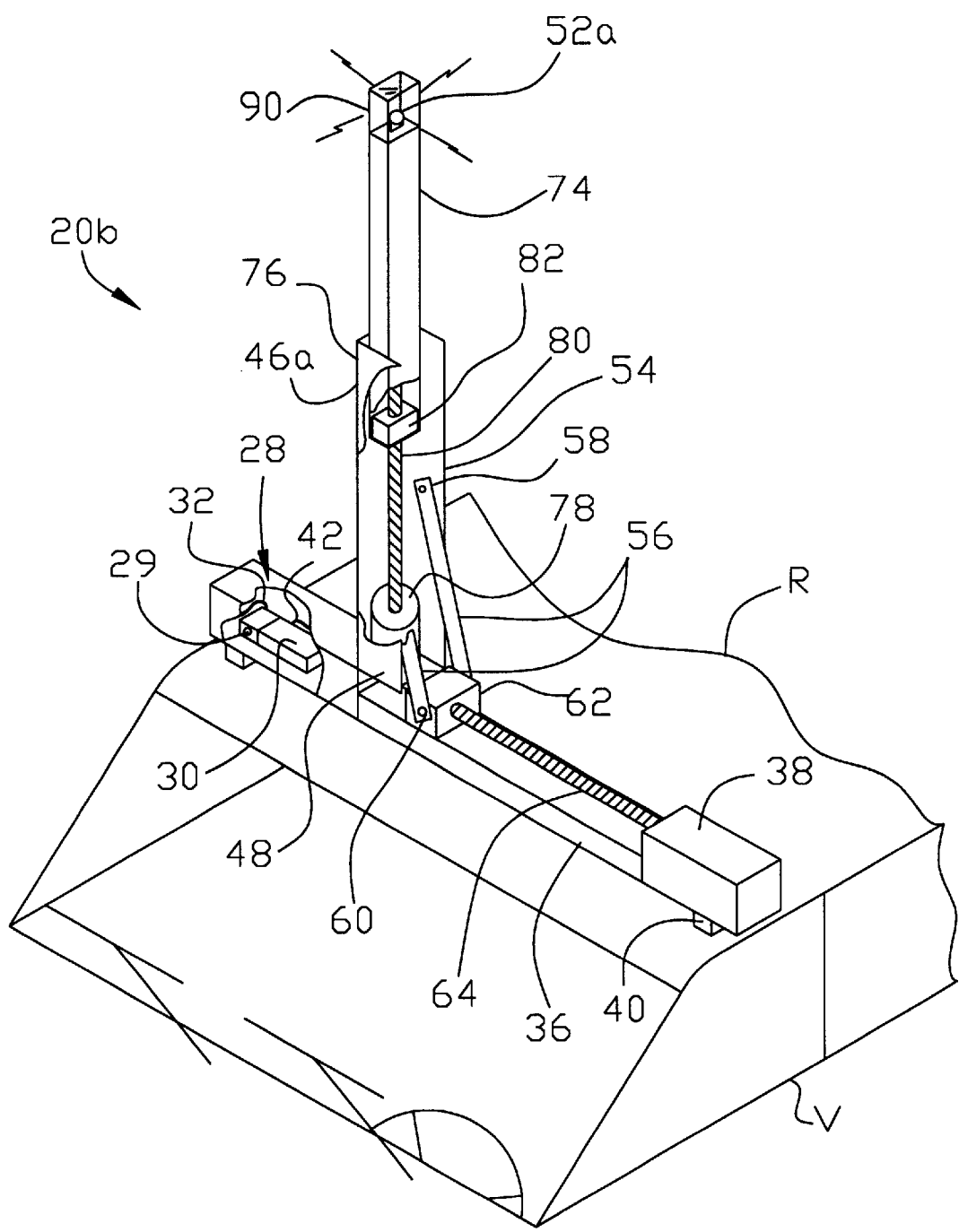
FIG. 4 is a partially sectioned front perspective view showing a third embodiment of the arm support structure with a telescopic arm section.
Figure 5:
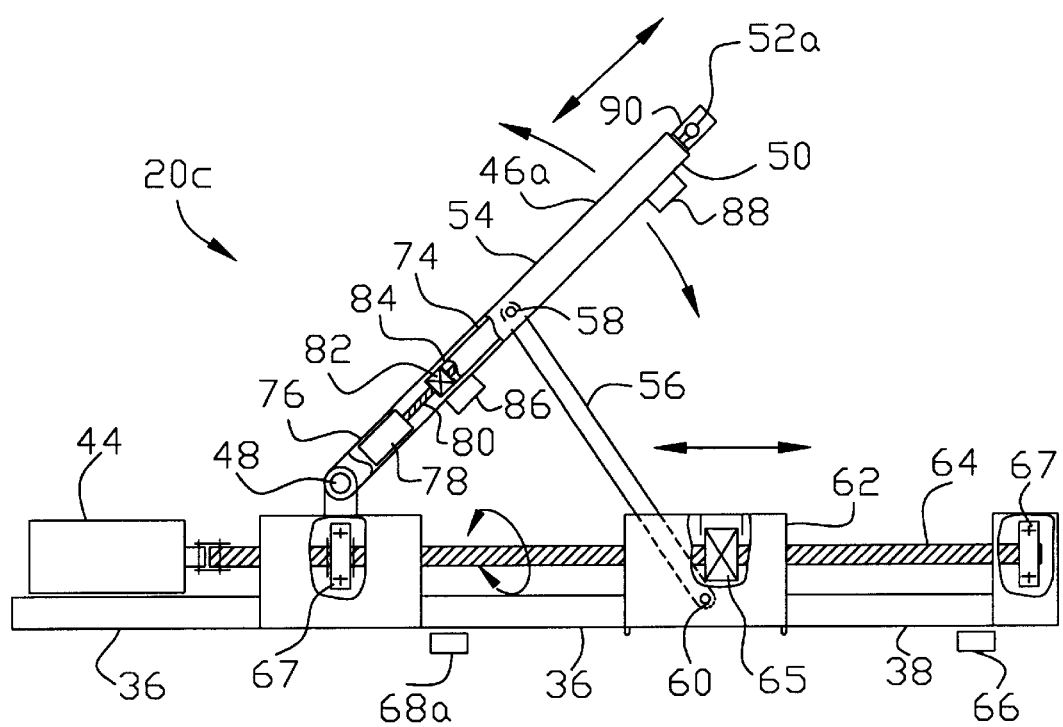
FIG. 5 is a view similar to FIG. 3 of a fourth embodiment with a weather unprotected telescopic arm section.

A third and a fourth embodiments of the vehicle locator device 20b, 20c are partially shown in FIGS. 4 and 5 respectively. This embodiment is used when it is required to locate the light sources 52a higher in order to better clear surrounding structures. Accordingly, the arm section 46a includes a telescopic upper member 74 slidably and longitudinally extending out of a lower member 76 of the arm section 46a under the activation of a second actuator that preferably includes a second reversible electric motor 78. The second motor 78, preferably secured to a first bottom end 48 of the arm section 46a, drives a second endless rotating screw 80. The second screw 80 of the second actuator 78 rotatably engages a second nut 82 fixedly secured to the bottom extremity 84 of the telescopic member 74 of the arm section 46a and that runs along the second screw 80 between a first folded and a second unfolded limit positions extended delimited by a third and a fourth limit switches 86, 88 respectively (see FIG. 5). The telescopic member 74 internally slides into guiding grooves (not shown) and carries the light sources 52a at its upper extremity 90.

Figure 9:
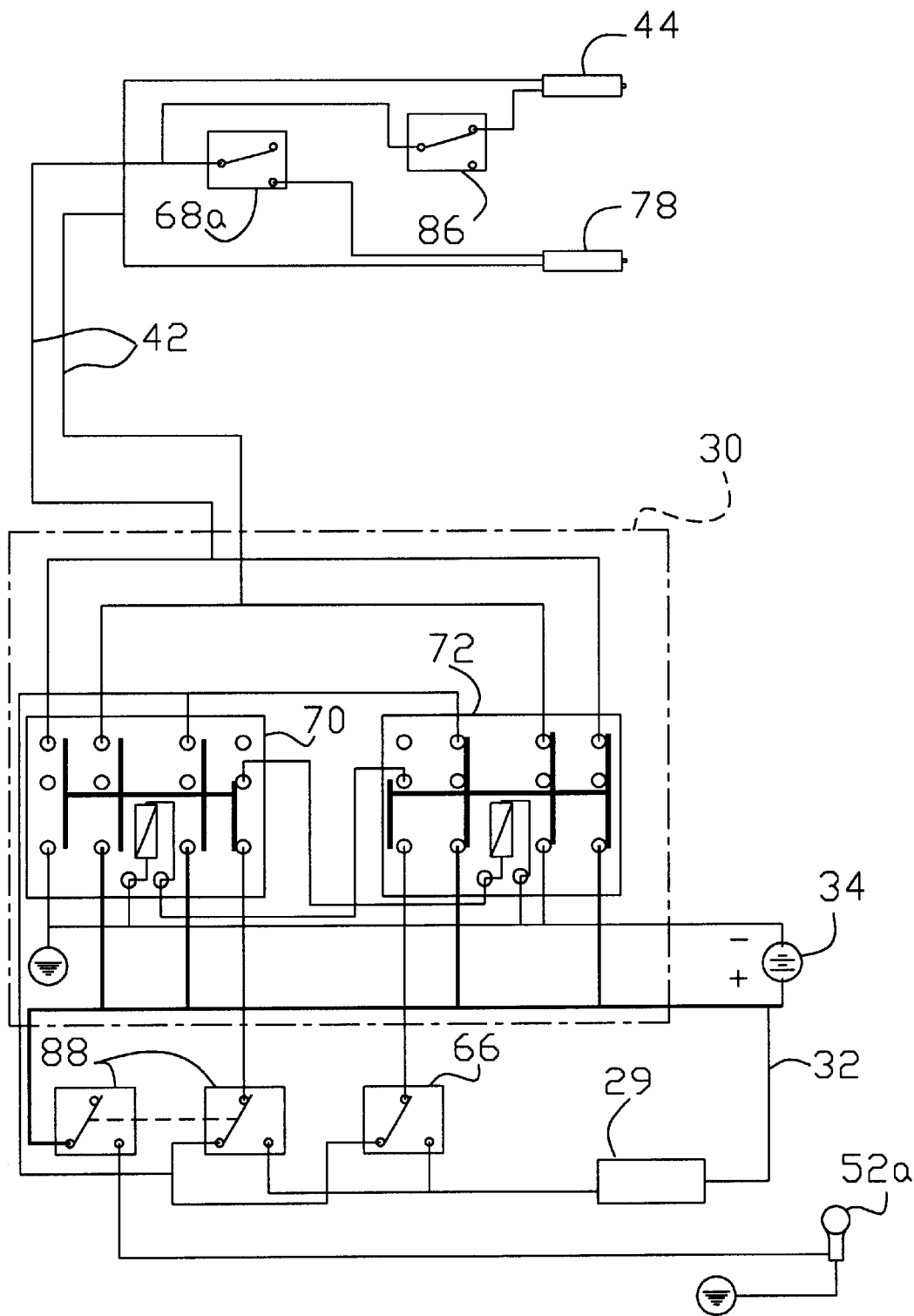
FIG. 9 is a diagram similar to FIG. 7 but referring to the embodiment of FIG. 5.

In this third embodiment 20b, when the sliding block 62 activates the second limit switch 68a (refer to the block diagram of FIG. 9), the first motor 44 is stopped and the second motor 78 is turned on while moving away from the third switch 86. When the telescopic member 74 reaches its extended limit position up to the fourth limit switch 88, preferably a pair of parallel switches simultaneously activated, that toggles back the first relay 72 to cut the power going to the second motor 78, and at the same time provides power to the light sources 52a.

Following the second pulse, the control circuit 30 toggles the second relay 70 to provide a reverse power to the second motor 78 and cuts power going to the light sources 52a. Then, the telescopic member 74 reaches its lower third limit position, it activates the third limit switch 86 that provides a reverse power to the first motor 44 and cuts the power going to the second motor until a complete retracted position of the arm section 46a is reached.

Figure 6:
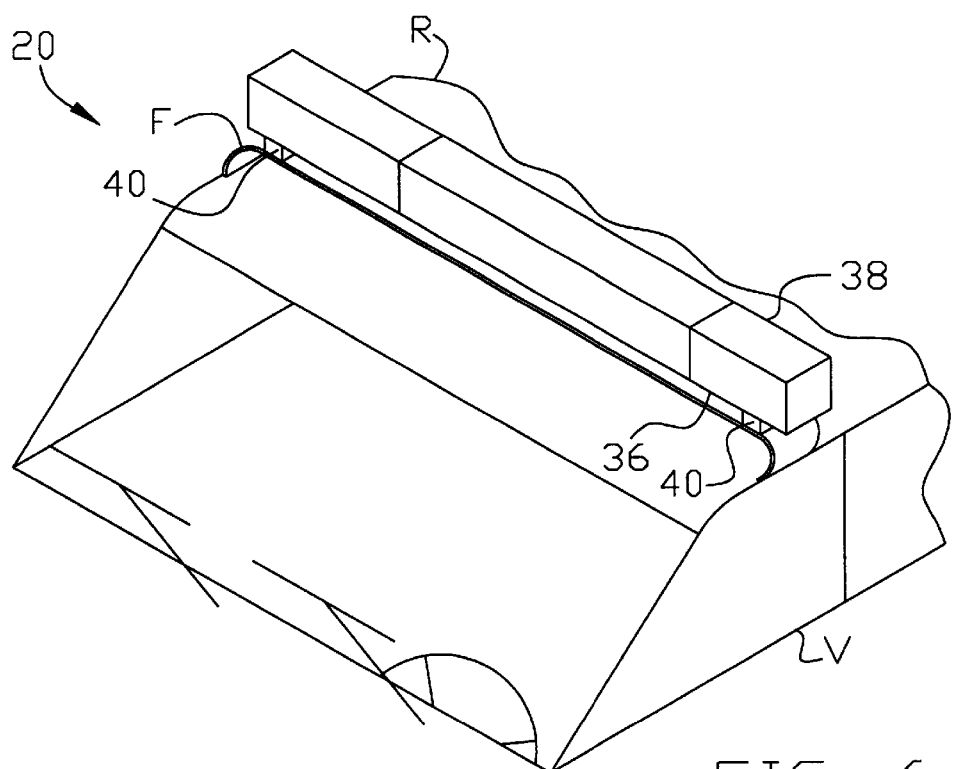
FIG. 6 is a front perspective view of a similar vehicle locator device of FIG. 4 secured on an existing vehicle's transverse roof luggage fixture.

FIG. 6 shows that the mounting fixtures 40 of the arm support structure 36 may also be adapted to mount on an existing roof luggage fixture F already mounted on the roof R of the vehicle V.

Alternatively, one skilled in the art would easily conceive that both actuators presented herein as being motors 44, 78 driving a respective endless screw 64, 80 engaging a respective nut 65, 82 could be respectively replaced by equivalent motors driving a respective pinion rotating the arm section 46 and engaging a sliding rack extending the arm section 46a, or in another way, equivalent mobile motors (motors located on the sliding block) driving a respective pinion engaging and rolling along a respective fixed rack, to reproduce the above described rotating and sliding motions.

Alternatively, in order to fully hide the light source 52 when the arm section 46 is in fully retracted position (as shown in FIG. 6), it would be possible to have the block 62 pulling the arm 46 with its bottom end 48 at the end of its run, just before hitting the switch 66, so as to have the light 52 to slightly slide underneath the support structure 36 (bearing 67 at the first end 48 being allow to slightly slide over the screw 64). Upon deployment command, the entire arm 46 would first be slightly displaced to fully expose the light 52 before abutting the support structure 36 and starting its raising deployment.

Although embodiments have been described herein with some particularity and details, many modifications and variations of the preferred embodiments are possible without deviating from the scope of the present invention.

I claim:

1. A vehicle locator device comprising:
   a remote transmitting unit including a transmitter and a first power source;
   an activation switch mounted on said remote unit and connected to said transmitter, said transmitting unit generates and emits a signal via said transmitter upon activation of said activation switch;
   a receiving unit generally mounted on a vehicle and including a control circuit and a receiver, both being connectable to a second power source, said receiving unit being adapted to receive said signal emitted from said transmitting unit;
   an arm support structure including a base section adapted to be secured onto a roof of said vehicle, and an arm section pivotally mounted onto said base section via an actuator device between an activated deployed position and a non-activated retracted position;
   one or more light sources mounted onto said arm section of said support structure, said actuator device and one or more light sources being connected to said receiving unit, both said one or more light sources and actuator device being energized by said second power source via said control circuit and disposed to either be turned on and deploy said arm section respectively as said receiving unit receives a first of said signal from said transmitting unit, or be turned off and retract said arm section respectively as said receiving unit receives a second of said signal from said transmitting unit.

2. A device as defined in claim 1, further comprising a first and second limit switches connected to said control circuit and detecting said retracted and deployed positions of said arm section respectively, said second limit switch being used to disconnect said actuator device deploying said arm section from said second power source and connect said light sources to said second power source, said first limit switch being used to disconnect said actuator device retracting said arm section from said second power source.

3. A device as defined in claim 1, wherein said base section is substantially horizontally secured onto said roof and said arm section is always positioned between said retracted and deployed positions being substantially horizontal and vertical respectively.

4. A device as defined in claim 1, wherein said support structure is adapted to be secured to an existing transverse roof luggage fixture.

5. A device as defined in claim 1, wherein said support structure is generally elongated in shape and transversely positioned to a direction of displacement of said vehicle.

6. A device as defined in claim 1, wherein said one or more light sources and actuator device are protected against bad weather conditions by both said base and arm sections when the latter is into said non-activated retracted position.

7. A device as defined in claim 2, wherein said arm section includes a first end pivotally mounted onto said base section, a second end adapted to receive said one or more light sources and a substantially mid-section adapted to pivotally engage a first extremity of a support bar, said support bar having a second extremity pivotally secured to a block slidably mounted onto said base section, said block being linearly displaced along said base section by said actuator device between said two limit switches.

8. A device as defined in claim 7, wherein said actuator device includes a reversible electrical motor activated in a first operating and a second reversible operating modes to deploy and retract said arm section respectively, and said second power source being a direct current supply of said vehicle.

9. A device as defined in claim 8, wherein said actuator device further includes an endless screw rotatably supported into said base section and rotatably engaging a nut fixedly secured to said block.

10. A device as defined in claim 1, wherein said arm section includes a lower and upper members, said lower member includes a bottom end pivotally mounted onto said base section, a substantially mid-section adapted to pivotally engage a first extremity of a support bar, said support bar having a second extremity pivotally secured to a block slidably mounted onto said base section, said block being linearly displaced along said base section by said actuator device between a first and a second limit positions corresponding to said retracted and deployed positions respectively, said lower member being adapted to slidably receive said upper member between a lower folded and a upper unfolded positions using a second actuator device energized by said second power source via said control circuit and mounted onto said lower member, said upper member being adapted to receive said one or more light sources at an upper extremity.

11. A device as defined in claim 10, further comprising a first and second limit switches connected to said control circuit and detecting said retracted and deployed positions of said arm section respectively, a third and fourth limit switches connected to said control circuit and detecting said unfolded and folded positions of said upper member of said arm section respectively, said second limit switch being used to disconnect said first actuator device deploying said arm section from said second power source and connecting said second actuator device unfolding said upper member to said second power source, said fourth limit switch being used to disconnect said second actuator device unfolding said upper member from and connect said light sources to said second power source, said third limit switch being used to disconnect said second actuator device folding said upper member from and connect said first actuator device retracting said arm section to said second power source, said first limit switch being used to disconnect said first actuator device retracting said arm section from said second power source.

12. A device as defined in claim 11, wherein said first actuator device includes a reversible electrical motor activated in a first operating and a second reversible operating modes to deploy and retract said arm section respectively, said second actuator device includes a second reversible electrical motor activated in a first operating and a second reverse operating modes to unfold and fold said upper member of said arm section respectively, said second power source being a direct current supply of said vehicle.

13. A device as defined in claim 12, wherein said first actuator device further includes a first endless screw rotatably supported into said base section and rotatably engaging a first nut fixedly secured to said block, and said second actuator device further includes a second endless screw rotatably supported into said lower member of said arm section and rotatably engaging a second nut fixedly secured to a lower extremity of said upper member of said arm section.

14. A device as defined in claim 2, wherein said control circuit of said receiving unit including two relays interconnected and connected to said first and second limit switches, said second power source and said actuator device.

15. A device as defined in claim 11, wherein said control circuit of said receiving unit including two relays interconnected and connected to said first, second, third and fourth limit switches, said second power source and said first and second actuator devices.

16. A device as defined in claim 14, wherein said relays being double position double contact type relays.

17. A device as defined in claim 15, wherein said relays being double position double contact type relays.

* * * * *